United States Patent [19]

Takai et al.

[11] Patent Number: 4,688,122
[45] Date of Patent: Aug. 18, 1987

[54] RELEASABLE CONNECTION ARRANGEMENT OF A LOADING AND/OR EJECTION MECHANISM IN A TAPE PLAYER

[75] Inventors: Kazuki Takai; Yukio Ito; Shigeo Kinoshita; Junichi Kikuchi; Toshihiko Fukazawa, all of Tokyo, Japan

[73] Assignee: Clarion Co., Ltd., Tokyo, Japan

[21] Appl. No.: 812,154

[22] Filed: Dec. 23, 1985

[30] Foreign Application Priority Data

Dec. 28, 1984 [JP] Japan ................................ 59-274932
Dec. 28, 1984 [JP] Japan ................................ 59-274933

[51] Int. Cl.⁴ ........................ G11B 15/00; G11B 17/00
[52] U.S. Cl. ..................................... 360/96.5; 360/71; 360/93
[58] Field of Search ............... 360/90, 71, 93, 96.5; 242/198-199

[56] References Cited

U.S. PATENT DOCUMENTS

| 3,669,456 | 6/1972 | Oteki | 242/198 X |
| 4,308,562 | 12/1981 | Negishi | 360/96.5 X |
| 4,434,444 | 2/1984 | Sato | 360/96.5 |
| 4,586,096 | 4/1986 | Okada | 360/96.5 |

Primary Examiner—John H. Wolff
Attorney, Agent, or Firm—Flynn, Thiel, Boutell & Tanis

[57] ABSTRACT

A loading and ejection mechanism in a tape player includes a link mechanism which transmits a motor power to a tape pack transport mechanism to drive same for loading or ejection of a tape cassette. The link mechanism includes at least one resilient connection member which normally maintains a power transmitting relationship of the link mechanism and a connection releasable arrangement which releases the power transmitting relationship of the link mechanism against the energy of the resilient connection member when an excessive load is applied to and locks the mechanism.

7 Claims, 4 Drawing Figures

RELEASABLE CONNECTION ARRANGEMENT OF A LOADING AND/OR EJECTION MECHANISM IN A TAPE PLAYER

FIELD OF THE INVENTION

This invention relates to a loading and ejection mechanism in a tape player using a motor power to effect loading and ejection of a cassette, and more particularly to a releasable connection arrangement provided in a loading and/or ejection assembly of the mechanism.

BACKGROUND OF THE INVENTION

A loading and ejection mechanism in a tape player is configured to drive a gear assembly and a drive plate by a motor power and responsively activate a cassette transport arrangement to effect loading or ejection of a cassette. Such a mechanism is adapted to disconnect the tape transport arrangement from the motor-side members after completion of a desired operation, by rotating an idler gear or using an intermittent gear, in order to prevent unnecessary movements of different members which have reached predetermined respective positions.

However, when some hitch occurs in such a prior art mechanism by accident before completion of a loading or ejecting operation, the entire mechanism often falls into an immovable or inoperative condition, sometimes forcibly locking the motor or sometimes causing a belt to slip in a motor pulley assembly. This undoubtedly invites destruction of the motor, cutting of the belt and other damages of the mechanism.

OBJECT OF THE INVENTION

It is therefore an object of the invention to provide a loading and ejection mechanism in a tape player including a unique releasable connection arrangement which can detach a drive source motor from a tape pack transport assembly when any hitch or blockage occurs in the tape pack transport. assembly before completion of ejection or loading of a cassette, so as to prevent an ejection or loading arrangement from being entirely locked in such an occasion.

SUMMARY OF THE INVENTION

According to the invention, there is provided a loading and ejection mechanism of a tape player wherein a motor power is transmitted to and drives a pack transport assembly via a link mechanism including a series of gears and other link members so that said pack transport assembly responsively effects loading or ejection of a tape cassette, said link mechanism comprising: at least one resilient means provided in said link mechanism and producing a resilient force within a normally required amount to establish the power transmitting linkage relationship of said link mechanism; and at least one connection releasable means associated with said resilient means to release the power transmitting linkage of said link mechanism against the energy of said resilient means when said link mechanism receives a large load which makes said loading and ejecting mechanism locked.

BRIEF DESCRIPTION OF THE DRAWINGS

FIGS. 3 and 4 are plan views of a further embodiment of loading and ejection mechanism according to the invention of which FIG. 3 shows the aspect upon completion of an ejecting operation and FIG. 4 shows the aspect before an ejecting operation is commenced.

DETAILED DESCRIPTION

Figure 1:
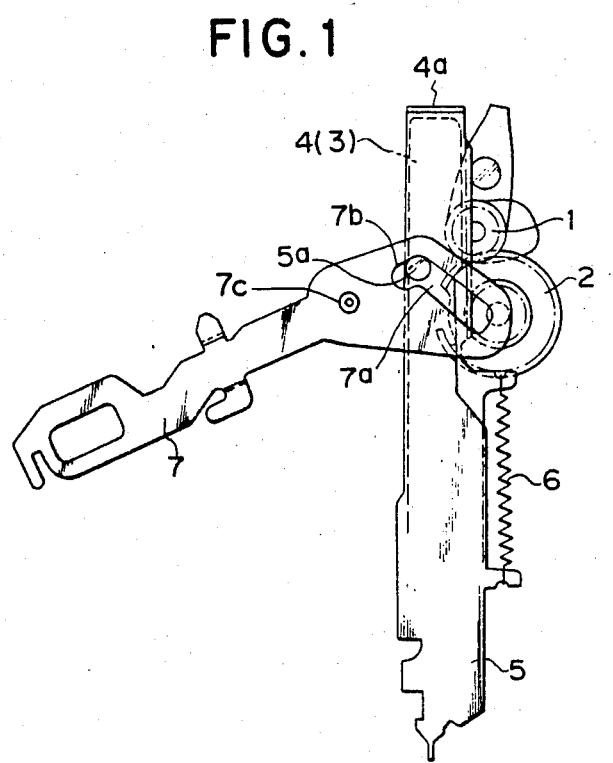
FIG. 1 is a plan view of an ejection arrangement in a loading and ejection mechanism embodying the invention.

The invention will be better understood from the description given below, referring to some preferred embodiments illustrated in the drawings which simply show structures to an extent necessary for explanation of the invention but do not illustrate other related but known members or arrangements.

Reffering to FIG. 1 which shows an ejection arrangement in a loading and ejection mechanism for a tape player embodying the invention, a swing gear 1 is connected to a motor not shown via a gear in a loading mechanism as will be described later. The swing gear 1 is configured to swing in response to a reverse rotation of a motor into engagement with an eject gear 2 to rotate same in a reverse direction. The eject gear 2 has a non-toothed portion and engages an eject plate 3 and an eject rack plate 4 laid thereover to move them back (upward in FIG. 1).

Above the eject plate 4 is provided an eject arm plate 5. The eject plate 4 has at a rear end thereof a rear bent member 4a which is engageable with the rear end of the eject arm plate 5 to push same forward (downward in FIG. 1). Both plates 4 and 5 are connected by an eject spring 6 and biased in a direction for relative engagement between the rear ends thereof. The biasing force, when valid, keeps a toothed rack on the eject rack plate 4 engaging the eject gear 2. The eject arm plate 5 and eject rack plate 4 are configured to act on a switch operating member not shown here so that the eject arm plate 5 in a predetermined advance position turns on a switch, the eject rack plate 4 fixed at an advance position retains the switch on, and the eject rack plate 4 at a withdrawal position turns off the switch.

An eject arm 7 for reciprocal transport of a cassette is linked to the eject arm plate 5. The eject arm 7 has a proximal end formed with an engagement hole which slidably accepts an engagement pin 5a formed on the eject arm plate 5. The engagement hole includes a linear portion 7a not causing rotation of the eject arm 7 regardless of displacement of the engagement pin 5a therein and includes a pivotal engagement portin 7b causing rotation of the eject arm 7 by movement of the engagement pin 5a therein. The engagement pin 5a moves along and within the linear portion 7a of the engagement hole before the eject rack plate 4 and eject arm plate 5 reach together a predetermined position where the engagement pin 5a engages the pivotal engagement portion 7b. After the pin 5a enters the pivotal engagement portion 7b, further withdrawal movement of the eject arm plate 5 causes the eject arm 7 to rotate counterclockwise and push out a cassette.

The arrangement of FIG. 1 operates as follows. For a normal cassette ejection, the motor is rotated reversely. The swing gear 1 driven by the motor rotates the eject gear 2 to withdraw the eject plate 3 and eject rack plate 4. Withdrawal of the eject plate 3 elevates the cassette to a height for ejection. Withdrawal of the eject rack plate 4 causes the eject arm plate 5 resiliently united thereto by the spring 6 to move back together. In this process, the engagement pin 5a of the eject arm plate 5 moves in the engagement hole of the eject arm 7 within the extent of the linerar portion 7a, and does not yet rotate the eject arm 7.

The eject plate 3, which has moved to a position to locate the cassette at a fully elevated position, disengages from the eject gear 2 and stops there. However, the eject rack plate 4 continues withdrawal, accompanied by the eject arm plate 5. Therefore, the engagement pin 5a enters the pivotal engagement portion 7b and rotates the eject arm 7 to push out the cassette. When the cassette is brought to a predetermined position, the eject arm 7 stops. The eject arm 4 slightly retreats, expanding the spring 6, and the power source is shut off thereby. Due to this, the motor is topped, and the plate 4 is also stopped.

In the event there occurs a distrubance of a streamlined ejecting operation which is often caused by a quick-tempered hand-touching to a cassette, for example, one or more members in the tape pack transport assembly such as eject arm 7, eject arm plate 5, etc. are often locked or in other words held against movement. According to the invention arrangement, however, since the eject rack plate 4 retreats by a distance allowed by expansion of the spring 6 regardless of a possible lock of the eject arm plate 5, the eject gear 2 is never locked.

Normally, the power source is shut off when the eject rack plate 4 retreats up to a position to remove its pressure from the switch operating member, In the above-referred abnormal condition, however, since the eject arm plate 5 is locked halfway, the switch is kept on to continuously rotate the eject gear 2, so that the eject rack plate 4 further retreats until the terminal end of the rack thereof disengages from the eject gear 2, and stops there. However, the energy of the spring pulls back the eject rack plate 4 into reengagement with the gear 2. More specifically, since disconnection occurs between the eject rack plate 4 and eject gear 2, the eject gear 2 and other members linked thereto never fall in a locked condition.

Figure 2:
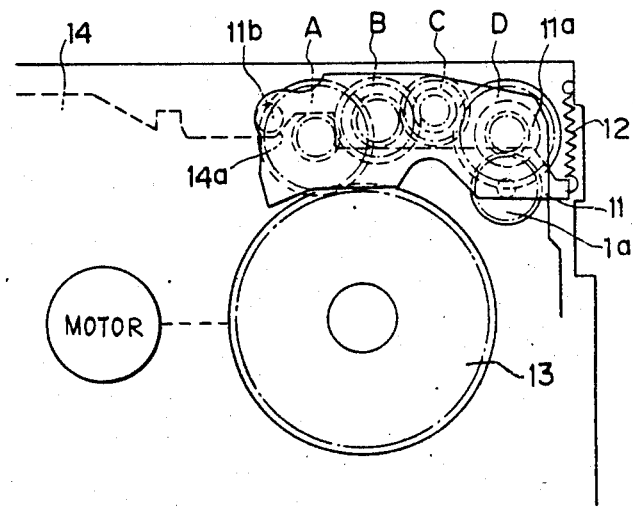
FIG. 2 is a plan view of a loading arrangement in the same embodiment.

FIG. 2 shows a loading arrangement associated with the ejection assembly of FIG. 1.

A loading gear plate 11 carrying thereon loading gears A through D is pivotable about a shaft 11a and biased by a spring 12 in a direction (counterclockwise in FIG. 2) to bring the gear A into engagement with a flywheel 13. The loading gear D engages the swing gear 1 of the ejection assembly of FIG. 1 to transmit a driving power from the loading assembly to the ejection assembly. The loading gear plate 11 has a distal end formed with a control pin 11b which is engageable with a tapered margin 14a of a head plate 14. When the head plate 14 advances (upward in FIG. 2), it engages and pushes the control pin 11b against the energy of the spring 12 and retains the plate 11 at an angular position for locating the loading gear A apart from the flywheel 13.

The arrangement of FIG. 2 operates as follows. Also referring to FIG. 1, an inserted cassette pushes and rotates the eject arm 7 clockwise. Concurrently, the eject arm plate 5 moves ahead, energizing the power source by activating the switch operating member. Since the head plate 14 still takes a withdrawal position (lower position in FIG. 2) at this time, the gear A on the plate 11 engages the flywheel 13 due to the energy of the spring 12. Therefore, the motor rotation commenced by the power supply is transmitted to the loading gears A through D so as to displace the swing gear 1 of the ejection assembly into engagement with the eject gear 2. Thereby the eject gear 2 rotates forward and brings the eject rack plate 4 ahead. After the eject rack plate 4 reaches a position for the rear bent portion 4a thereof to engage the eject arm plate 5, both plates 4 and 5 move forward together and further rotate the eject arm 7 to pull the cassette inward.

When the cassette is fully inserted, the eject plate 3 engages the eject gear 2 and moves ahead together with the eject rack plate 4. Thereby the cassette is dropped to a play position by an arrangement not shown. Concurrently,t he swing gear 1 is opposed to the non-toothed portion of the eject gear 2 and disengages therefrom. The eject gear 2 stops after a slight rotation effected by a rotating means (not shown) provided below the gear 2, thus completing the loading operation. Subsequently, the head plate 14 moves ahead, and the control pin 11b is then pushed by the tapered margin 14a. Therefore, the loading gear plate 11 is rotated clockwise so that the loading gear A disengages from the flywheel 13. Thus the loading and ejection mechanism is retained in pause.

In the event one or more of the eject plate 3, eject rack plate 4 and other members fall in a locked condition because of some part of the mechanism capturing the cassette before completion of the loading operation, the loading gear plate 11 receives an increased load which is opposite to and larger than the energy of the spring 12, and rotates clockwise to detach the series of the loading gears A through D from the flywheel 13. Therefore, the arrangement of FIG. 2 also reliably prevents motor-side members from being locked and reliably prevents damages of the mechanism.

Figure 3:
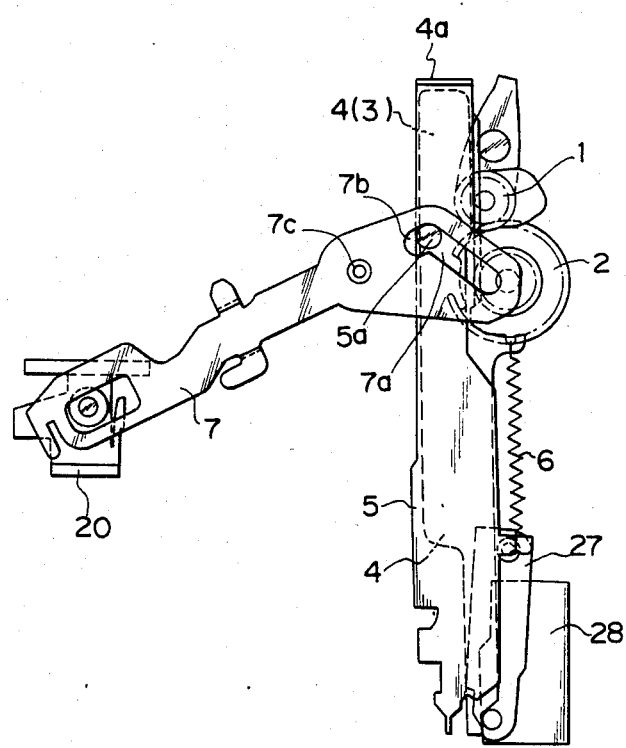
Figure 4:
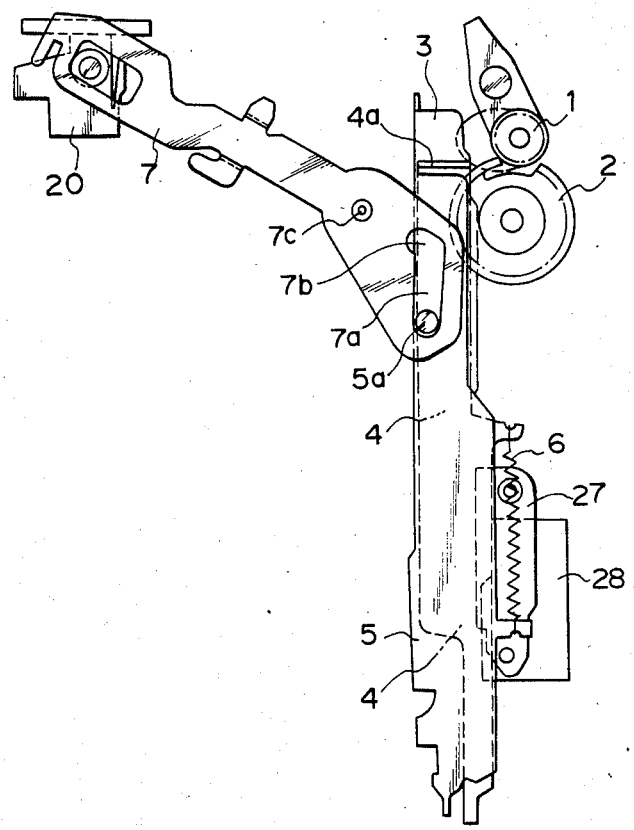

FIGS. 3 and 4 show a further embodiment of the invention. The eject arm plate 5 and eject rack plate 4 are configured to act on a switch operating link 27. The eject arm plate 5, when reading a predetermined position, acts on the switch line 27 to actuate a switch 28 and thus energize a motor. The eject rack plate 4 maintains the switch 28 on while it remains at an advance position, and turns off the switch 28 to stop the motor when it withdraws.

Before the eject arm plate 5 retracting together with the eject rack plate 4 reaches a predetermined position, the engagement pin 5a on the plate 5 moves in the engagement hole of the eject arm 7 within the extent of the linear portion 7a. After the eject arm plate 5 reaches the predetermined position, the engagement pin 5a enters the pivotal engagement portion 7b and rotates the eject arm 7 counterclockwise (in the ejecting direction) to push out the cassette via a pack stopper 20.

Upon completion of an ejecting operation, the eject rack plate 4 slightly retracts, expanding the spring 6, and acts on the switch operating link 27 to shut off the power source. The expanded spring 6 produces a counterforce to pull back the eject arm plate 5. As the result, the eject arm 7 is compressed in the ejecting direction and brings the pack stopper 20 to a position ready for the next insertion of a cassette.

The embodiment of FIGS. 3 and 4 operates as follows. During a play mode before an ejecting operation is commenced, the eject plate 3, eject rack plate 4 and eject arm plate 5 take advance positions, whereas the eject arm 7 and pack stopper 20 are retained at withdrawal positions. The switch 28 is maintained in the on-state via the switch operating line 27 because the eject arm plate 5 is located in the advance position.

When an ejecting operation is commenced from the aforegoing condition, the motor rotation is inverted.

Responsively, the swing gear 1 and eject gear 2 are rotated, and the eject plate 3 and eject rack plate 4 retreat.

The eject plate 3 in withdrawal elevates the cassette to the height for ejection. The eject arm plate 5 resiliently connected to the eject rack plate 4 by the spring 6 moves together with the plate 4. During this movement, the engagement pin 5a on the eject arm plate 5 moves back in the engagement hole of the eject arm 7 within the extent of the linear portion 7a, and does not yet rotate the eject arm 7.

Subsequently, the eject plate 3, when reaching a position to fully elevate the cassette, disengages from the eject gear 2 and stops there. However, the eject rack plate 4 continues retraction, bringing the eject arm plate 5 with it, so that the engagement pin 5a enters the pivotal engagement portion 7b of the engagement hole of the eject arm 7. Therefore, the eject arm 7 is rotated, pushing the pack stopper 20 forward. When the pack stopper 20 reaches the position for cassette acceptance, it is fixed by a fixing means and cannot further move ahead. Therefore, the eject arm 7 and eject arm plate 5 stop there. The eject rack plate 4 still depresses the switch operating link 27 when the eject arm plate 5 is stopped, but continues withdrawal until removing the depression from the link 27. The link 27, when released from the eject rack plate 4, snaps back and turns off the switch 28 to stop the motor rotation. This slight retraction of the eject rack plate 4 after the pause of the eject arm plate 5 expands the spring 6 and makes it produce a counterforce. The eject arm plate 5 is pulled back by the counter force of the spring 6, and rotates the eject arm 7 to bring the pack stopper 20 to the standby position for cassette acceptance.

This embodiment does not use a spring specifically used in the prior art mechanism for retaining the pack stopper, and contributes to a reduction of the parts. This enables cost reduction and mounting space saving. Further, since elimination of one spring reduces the load to the mechanism by a corresponding amount, the mechanism is elongated in life and improved in reliability.

It should be noted that the invention is never limited to the embodiments described above. The disconnecting arrangement may be provided in both or one of the loading and ejection arrangements.

As described, the invention mechanism includes one or more detachable means for temporarily disconnecting the streamlined power transmitting relationship. Therefore, if any member engaged in tape transport is locked before completion of a loading or ejecting operation, the mechanism is automatically disconnected for a moment, and reliably prevents any motor-side member from being locked. This arrangment significantly reduces damages or destruction of the mechanism.

The embodiments of the invention in which an exclusive property or privilege is claimed are defined as follows:

1. A tape pack moving mechanism for a tape player, comprising pack transport means for engaging and effecting movement of a tape pack within the tape player, a motor, and link means for drivingly coupling said motor to said pack transport means, said link means including a first movably supported link part, a second movably supported link part, first means for drivingly coupling said motor to said first link part so as to effect movement thereof, second means for drivingly coupling said second link part to said pack transport means, and third means for facilitating an operative coupling of said first and second link parts so as to effect movement of said second link part in response to movement of said first link part when a minimum force which said first link part must exert on said second link part in order to effect movement thereof is less than a predetermined value and for interrupting said operative connection between said first and second link parts when said minimum force is in excess of said predetermined value, said third means including said first and second link parts being supported for relative movement and said first link part moving in a first direction relative to said second link part when said minimum force exceeds said predetermined value, and said third means including resilient means for urging movement of said first link part in a second direction opposite said first direction relative to said second link part.

2. The mechanism of claim 1, wherein said first means includes a rotatably supported swing gear operatively coupled to and driven by said motor, and a rotatably supported eject gear selectively engageable with said swing gear; wherein said first link part is an eject rack plate supported for reciprocal movement parallel to said first and second directions and having a rack extending in said first direction and engageable with said eject gear; wherein said second link part is an eject arm plate supported for reciprocal movement parallel to said first and second directions independently of said eject rack plate; and wherein said resilient means includes a resilient element which is coupled to said eject rack plate and eject arm plate and urges said eject rack plate in said second direction toward a position in which said rack thereon engages said eject gear.

3. The mechanism of claim 2, wherein said pack transport means includes a movably supported eject arm having therein an engagement hole which slidably receives an engagement pin provided on said eject arm plate.

4. The mechanism of claim 3, further comprising a switch which controls actuation of said motor, a movable switch operating link which is controlled by said eject arm plate and turns said switch on and off, and a reciprocally movably supported pack stopper which can engage a tape pack disposed in the tape player, and which is coupled to and moved by said eject arm so as to effect movement of a tape pack within the tape player.

5. The mechanism of claim 1, wherein said first link part is a first gear supported for rotation about a first axis, wherein said second link part is a second gear supported for rotation about a second axis parallel to said first axis, wherein said movement of said first gear in said first direction relative to said second gear is movement radially away from said second gear from a position in which teeth on said first and second gears are engaged to a position in which the teeth on said first and second gears are free of engagement.

6. The mechanism of claim 5, wherein said third means includes a loading gear plate supported for pivotal movement about a third axis parallel to said first and second axes, wherein said second gear is rotatably supported on said loading gear plate at a location spaced radially from said third axis, and wherein said resilient means urges pivotal movement of said loading gear plate about said third axis in a direction corresponding to relative movement of said second gear radially toward said first gear.

7. The mechanism of claim 6, wherein said second means includes first, second and third load gears rotatably supported on said loading gear plate, said second gear being drivingly engaged with said first load gear, said first load gear being drivingly engaged with said second load gear, and said second load gear being drivingly engaged with said third load gear, said second means further including means for drivingly coupling said third load gear to said pack transport means.

* * * * *